United States Patent [19]
Ferrari

[11] 3,865,667

[45] Feb. 11, 1975

[54] METHOD FOR THE PRODUCTION OF SHEATH CONTAINERS

[76] Inventor: Ottavio Ferrari, Via A. Lincoln 1/A, Carpi, Italy

[22] Filed: Oct. 25, 1972

[21] Appl. No.: 300,562

[30] Foreign Application Priority Data
Oct. 25, 1971 Italy.................................30263
Oct. 25, 1971 Italy.................................30264

[52] U.S. Cl................... 156/285, 53/22 A, 156/290, 156/292, 249/119, 264/88, 264/90, 264/94, 264/95
[51] Int. Cl............................................. B29c 3/00
[58] Field of Search........... 156/145, 147, 242, 245, 156/285, 290, 292, 381, 382; 264/88, 90, 94, 95, 96, 101; 53/22 R, 22 A, 22 B, 26, 28, 29; 249/119; 425/405, 408

[56] References Cited
UNITED STATES PATENTS
| | | | |
|---|---|---|---|
| 2,541,249 | 2/1951 | Hobson............................... | 249/119 |
| 2,991,500 | 7/1961 | Hagen.................................. | 156/292 |
| 3,114,172 | 12/1963 | Coste.................................. | 156/292 |

FOREIGN PATENTS OR APPLICATIONS
| | | | |
|---|---|---|---|
| 210,986 | 10/1957 | Australia................................. | 53/28 |
| 1,091,831 | 4/1955 | France..................................... | 53/28 |

Primary Examiner—Douglas J. Drummond
Assistant Examiner—Caleb Weston
Attorney, Agent, or Firm—Guido Modiano; Albert Josif

[57] ABSTRACT

A process for the continuous production in strip form of sheath containers for packaging materials such as suppositories and the like, comprising a thermowelding of a pair of superposed films of thermoplastic material to form a plurality of non-welded zones transversely to a central non-welded longitudinal zone, and a stage of forming, said non-welded zones by air passing through said longitudinal zone. During the forming phase a non permanent closure of this longitudinal zone is attained by maintaining the closure zone at a temperature less than the thermowelding temperature in order to allow forwarding of the welded portion of the films and prosecution of the drawing through the air passing in said longitudinal non closed zone. An apparatus is further provided for carrying out this method, having a mould in which said non permanent closure is attained.

7 Claims, 11 Drawing Figures

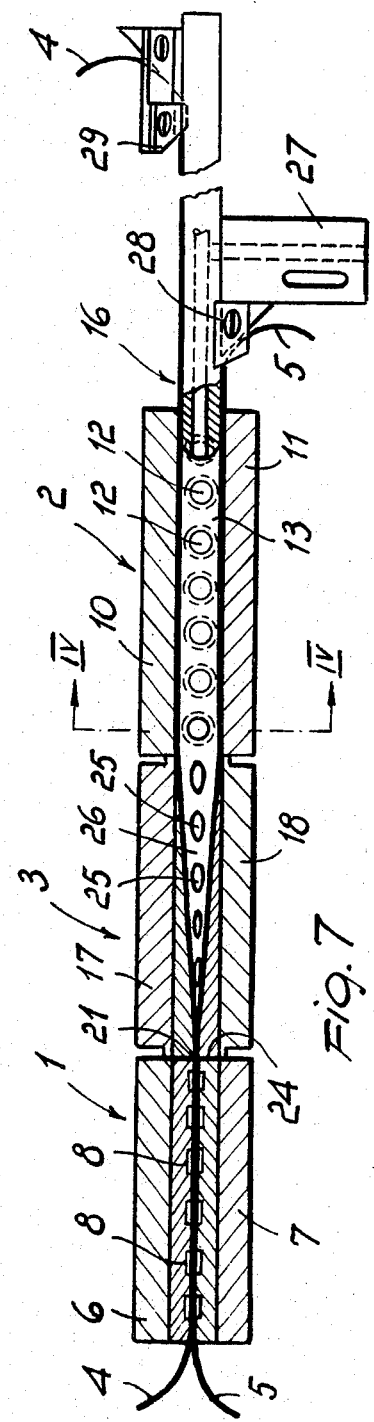
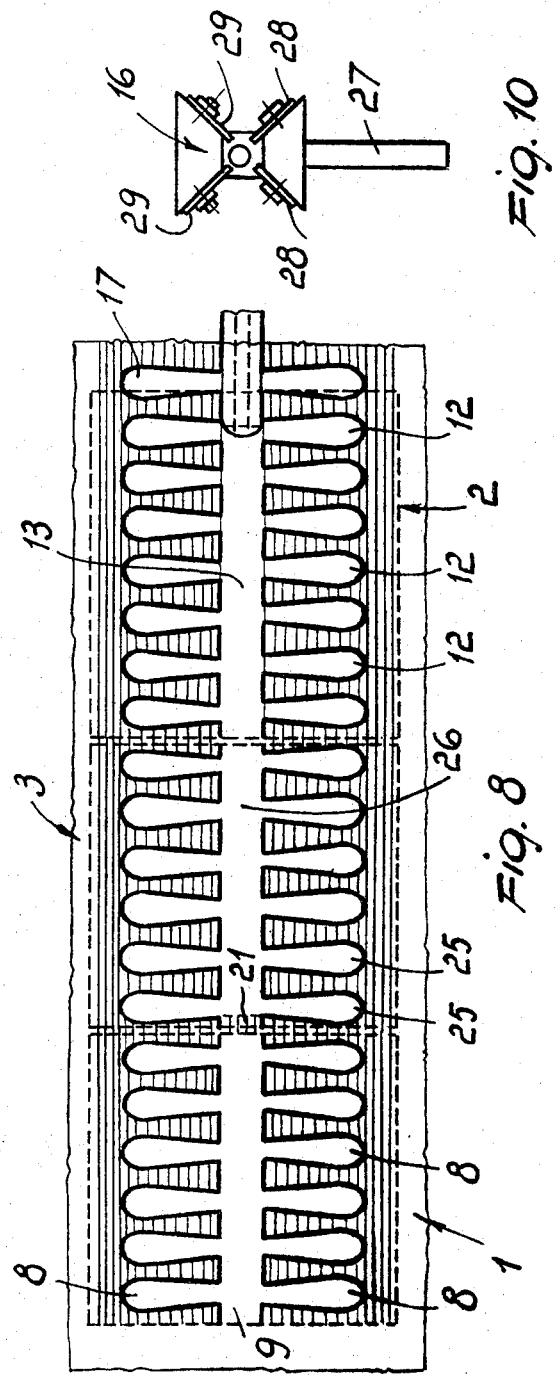

METHOD FOR THE PRODUCTION OF SHEATH CONTAINERS

BACKGROUND OF THE INVENTION

The present invention relates to a method for the continuous production in strip form of sheath containers, particularly for packaging material insertable into said containers, for example for packaging articles such as suppositories, lipsticks, candles, pencils, chocolate articles and the like. For greater simplifications, reference will be made in the present description to the packaging of suppositories, without evidently being limited to these. The invention further refers to an apparatus for carrying out said method.

For producing containers of the aforementioned type a process is known from Italian Pat. No. 655,921 in which two sheets or films of plastic material are fed one superimposed on the other to a welding station in which certain parts are welded with respect to other non-welded parts; these non-welded parts are designed to constitute the sheaths of the desired configuration; the sheets welded in this superimposed manner are fed to a second station for forming said sheaths, their formation being obtained for example by blowing air under pressure between said sheaths at their non-welded zones; or subjecting non-welded zones to suction. This latter process relates to the production of sheaths which extend longitudinally with respect to the superimposed plastic films, and all the sheaths are in communication one with another by way of a non-welded zone which extends transversely to said films. The forming station for the sheaths consists essentially of a mould comprising a plurality of forming cavities whose sizes correspond to that of the sheaths to be produced. The welded films are fed to this mould in a step-wise manner such that the aforementioned non-welded zones lie in positions exactly corresponding to the cavities in the mould. The mould also comprises a further cavity, corresponding exactly with the aforementioned transverse non-welded zone, which connects all the non-welded zones (designed to form sheaths). The mould also comprises a nozzle communicating with said transverse cavity, through which after the mould has been closed air is fed under pressure, to simultaneously produce the required sheaths by drawing said films. With this process and the relative apparatus, products (sheath containers) are obtained with continuity and precision, but disadvantages may arise due precisely to the disposition chosen for producing the sheaths. In fact it is necessary to make a series of cuts (transversal to the films) between one set of sheaths and the next in order to fill them with injectable material. Every piece cut comprises a certain fixed number of sheaths according to the size (width) of the films and the number of cavities provided in the drawing mould.

A further process is known from Italian Pat. No. 875,721 in which the position of the non-welded zones of the overlying sheets of plastic material is changed, such that the non-welded zones designed to successively form the sheaths extend transversely to the sheets of plastics material, and said zones communicate one with another by way of a non-welded elongated zone extending longitudinally to the sheets. In a first embodiment of this process, a mould is used with its central duct in communication with the sheaths fed with air under pressure through a nozzle disposed laterally to the overlying films and transversely to their direction of motion. In this embodiment, the disadvantages of the previously described process remain unchanged. In a second embodiment of this process, a mould is used with respect to which the feed nozzle for the drawing air is arranged downstream in substantially axial prolongation of the central duct. With this new disposition it is possible to obtain sheath containers continuously in strip form, without relating the number of sheaths to the dimensions of the film or to the number of cavities provided in the drawing mould. This process however gives rise to some disadvantages which make it disadvantageous in practice. When the drawing mould is closed it always causes a contraction of the central duct through which the air or other fluid under pressure is blown for forming the sheaths, and this contraction makes it difficult to carry out a further drawing phase after the first drawing phase.

The critical point of this process in fact lies in the need to close the feed duct for the blowing or drawing air (this closure is necessary for carrying out the drawing process) while at the same time preventing the closure of the mould or moulds from giving rise to any interruption, discontinuity or contraction of the duct formed in the superimposed films.

SUMMARY OF THE INVENTION

The fundamental object of the present invention is to provide a process and the relative apparatus for the continuous production in strip form of sheath containers for packaging materials of the stated type, which on the one hand solve efficiently and advantageously the technical problem defined above, and on the other hand enable not only a higher daily production of said sheath containers in strip form to be obtained but also enable containers to be obtained having structural and configurational properties and characteristics which are considerably improved and constant in comparison with known processes.

This object is attained by a method for the continuous production in strip form of sheath containers for packaging materials insertable into said containers, comprising a stage of thermowelding a pair of superimposed films to form a plurality of non-welded zones extending substantially transversely to the direction of motion of said films and a non-welded central longitudinal zone, and a stage of drawing said non-welded zones by air in order to obtain said sheath containers, and comprising the temporary closure of said central longitudinal zone during the drawing stage at a point upstream of the drawing zone by maintaining the closure zone at a temperature less than the thermowelding temperature of said films.

For carrying out the method according to the invention an apparatus is provided comprising moulds defining when in the closed position a plurality of seats or cavities and at least one longitudinal through duct, said seats or cavities being disposed symmetrically and transversely to said lonigtudinal duct, and comprising at least one thermowelding mould, at least one drawing mould downstream of said thermowelding mould, and at least a third mould disposed upstream of said drawing mould and defining in the closed state a part of said longitudinal duct open at one end and closed tight against air under pressure at the other end, an assembly for blowing air into or drawing air from said moulds, said moulds being disposed along the direction of advancement of said superimposed films and being subjected to means for their simultaneous opening and closing, and means for adjusting and controlling the temperature of said moulds.

BRIEF DESCRIPTION OF THE DRAWINGS

Further particulars of the invention will be more evident from the detailed description of a preferred embodiment, illustrated by way of example in the accompanying drawings, in which:

FIG. 7 is a diagrammatical sectional view through the longitudinal centre line of a further embodiment of the apparatus according to the invention;

FIG. 8 is a sectional view from above through the longitudinal centre line of the apparatus of FIG. 7;

FIGS. 10 and 11 show a constructional detail of the apparatus of FIG. 7 and a modification of it, respectively.

DESCRIPTION OF THE PREFERRED EMBODIMENT

Figure 1:
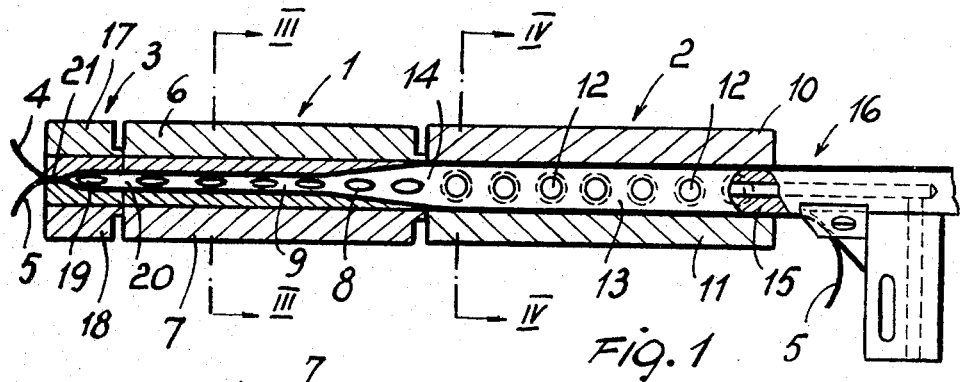
FIG. 1 is a diagrammatical sectional elevation of an assembly of moulds for carrying out the process according to the invention.
Figure 2:
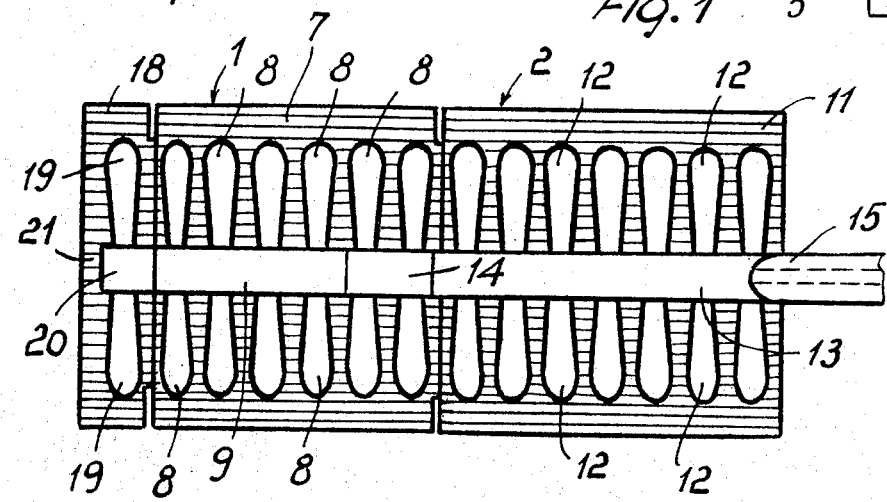
FIG. 2 is a view from above of the same assembly of moulds of FIG. 1 in the open position.
Figure 3:
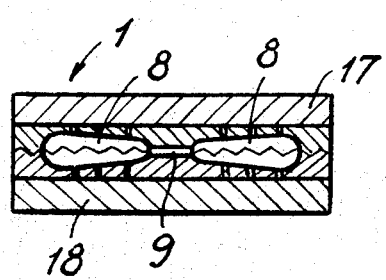
FIGS. 3 and 4 are sections on the lines III—III and IV—IV respectively of FIG. 1.
Figure 4:
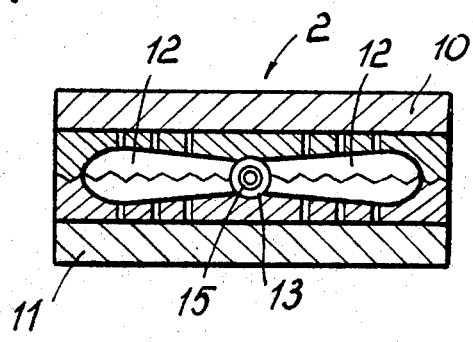

For carrying out the process according to the present invention, a first embodiment of an apparatus is provided as illustrated diagrammatically in FIGS. 1 to 4, consisting essentially of moulds 1 and 2 and a false mould 3, disposed in succession and close to each other along the line of advancement of a pair of superimposed films 4 and 5. The films are made of a thermoplastic material which has all the chemical and physical characteristics required for the sheath containers to be produced.

The mould 1, or thermowelding mould, consists of two symmetrical plates 6 and 7 which when placed together (FIG. 1) define a plurality of seats 8 grouped together and regularly distributed in two lines (FIGS. 3 and 4) symmetrical and transversal to a through duct 9 formed in said thermowelding mould 1. Said duct 9, which extends centrally and longitudinally to the direction of advancement of the superimposed films 4 and 5, comprises an enlargement in its cross-section in the terminal part facing the mould 2. This mould 2 or forming mould also comprises a pair of symmetrical plates 10 and 11 which when placed together define a plurality of seats or cavities 12, symmetrically and transversely disposed with respect to a central duct 13 formed in said mould 2. Said duct 13 extends as a prolongation of the preceding duct 9, without discontinuity, and has a diameter exactly equal to the diameter of the mouth 14 of said duct 9, facing the mould 2. The seats or cavities 8 and 12 defined by the moulds 1 and 2 have a configuration which corresponds to the final sheaths to be obtained in the superimposed films 4 and 5. In the case shown in the figure said seats or cavities 8 and 12 have a configuration suitable for the production of sheaths for suppositories but they may evidently be of any form. The head 15 of a nozzle indicated overall by the reference numeral 16 for feeding the air necessary during the forming or drawing stage engages in the duct 13 at the downstream end of the mould 2, with respect to the direction of advancement of the superimposed forms 4 and 5. At the upstream end of the mould 1 there is the false mould 3, consisting also of a symmetrical pair of plates 17 and 18 which when closed define at least one pair of seats or cavities 19, symmetrically disposed with respect to a central duct 20 also defined by said false mould 3. The duct 20, which has a cross-section of diameter equal to that of the duct 9 of the mould 1, is closed just upstream of the cavities 19 by the mating of the plates 17 and 18 in the end section 21, to form a seal tight against air under pressure.

The moulds 1, 2 and the false mould 3 of the molding equipment described constitute an assembly of elements which are all simultaneously subjected to a single opening and closing unit (not shown in the figures) and are also provided with members for adjusting and controlling the temperature of said moulds at the required values, and which will be described hereinafter.

The process according to the invention is carried out by way of example in the following manner. After positioning the films 4 and 5 between the plates which form the assembly of moulds previously described so that they pass beyond said assembly, the moulds are all simultaneously closed on to the films and the working cycle is started. The superimposed continuous films 4 and 5 are fed intermittently to the assembly of moulds and the pitch of advancement of said films corresponds exactly to the length comprising all the seats or cavities defined by the thermowelding mould 1. When the moulds have been closed, a thermowelding stage is first carried out to form non-welded zones, exactly corresponding to the cavities 8 and the central longitudinal duct 9, defined by the plates 6 and 7 of the mould 1. If the plastic films 4 and 5 are of polyvinyl chloride, the thermowelding temperature employed in the mould 1 is about 200°C. All moulds are now simultaneously opened and the films 4 and 5 are advanced by one step. With this second advancement the previously thermowelded section is now moved into a position corresponding to the mould 2, whereas a new length of superimposed films becomes positioned to the thermowelding mould 1. All moulds are now simultaneously closed (including the false mould 3) and air under pressure or other pressure fluid is fed into the duct 13 through the nozzle 16. While a further thermowelding stage is taking place in the mould 1 to form non-welded zones as previously described, in the drawing mould 2 the zones not welded during the previous stage are drawn by the air fed under pressure into the duct 13. If polyvinyl chloride films are used the temperature in the drawing die is maintained, for example, at a value of about 50°C. The duct 13, which extends downstream into the ducts 9 and 20 of the thermowelding mould 1 and false mould 3 respectively, is closed in the zone 21 of the false mould 3 in an airtight manner. This false mould 3 is kept at a temperature less than the thermowelding temperature, for example at a temperature in the order of 100°–150°C. By this arrangement, the airtight closure of the ducts 13-9-20, which is necessary in order to carry out the previously described drawing stage, does not result in any discontinuity, contraction or the like in the superimposed films so avoiding the main disadvantage of the known methods. A further arrangement used in the process according to this invention is to give the drawing mould 2 a plurality of pairs of seats or cavities 12, of a number equal to one pair more than the number of pairs of seats provided in the thermowelding mould 1. With this arrangement a perfect seal is guaranteed between the mouth 15 of the nozzle 16 and the end section of the duct 13. Downstream of the apparatus previously described, there will be stations for separating the edges of the shaped strip leaving the apparatus, for cutting into lengths of any required number of sheaths, for filling the sheaths with a material to be packaged in them, for cooling the product, for sealing the sheats and for the final packaging.

Figure 5:
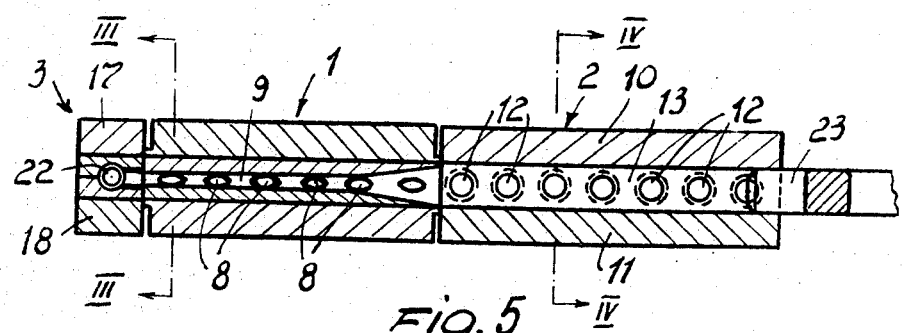
FIGS. 5 and 6 are a sectional elevational view and a view from above respectively of a modification of an assembly of moulds for carrying out the process according to the invention.
Figure 6:
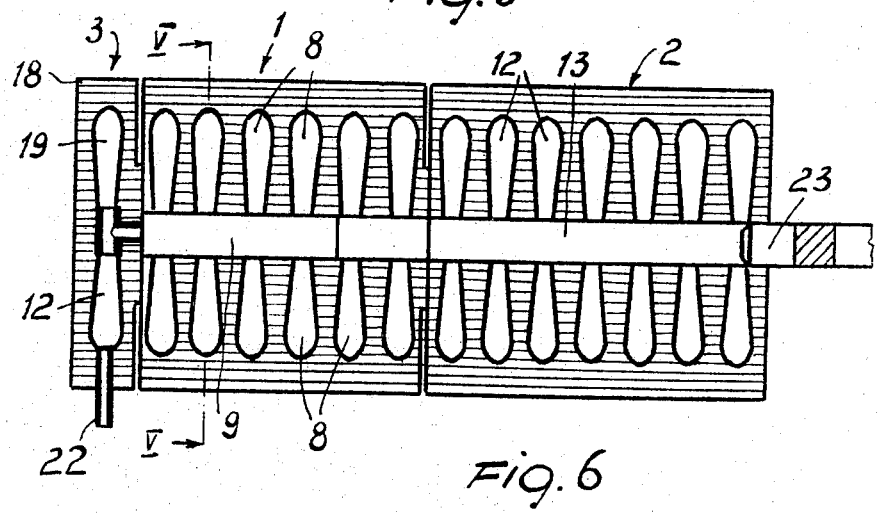

FIGS. 5 and 6 of the drawing show a modification of the assembly of moulds according to the invention. In this modification the arrangement of the moulds 1, 2 and 3 and their main function remains unvaried, but the false mould 3 is equipped in such a manner that the air necessary for the drawing stage may be blown through it. For this purpose the plates 17 and 18 of said false mould 3 define in the closed position a lateral duct 22 in communication, for example, with one of the previously described cavities 19, whereas at the downstream end of the duct 13 there is a sealing member or plug 23. Evidently said duct 22 for feeding the air under pressure may be provided aligned axially with the ducts 13, 9 and 20 defined respectively by the moulds 2, 1 and false mould 3.

The false mould 3 may also be positioned differently to that previously described with respect to the moulds 1 and 2. For example said false mould 3 may be placed between the moulds 1 and 2, remembering that the mould 3 has the task of sealing in an airtight manner the duct for blowing the drawing air.

In this case, in a particularly advantageous form of the invention, the apparatus shown in FIGS. 7–11 is used.

The mould 1, or welding mould, comprises in this case a cavity 8 of slightly different shape, as it need now only weld the zone between the sheaths, and no longer comprises the mouth 14 but instead has a constant cross-section to its end 24.

The mould 3, disposed upstream of the drawing mould 2, consists in this case of a pair of plates 17 and 18 which, when brought together define a corresponding plurality of seats or cavities 25 and a central duct 26 for conveying the air for the drawing. This duct 26, which extends centrally and longitudinally with respect to the mould 3, has a cross-section (for example square, circular, elliptical or the like) which tapers from the end of the mould 3 close to the mould 2 towards the end 21 close to the mould 1.

Figure 9:
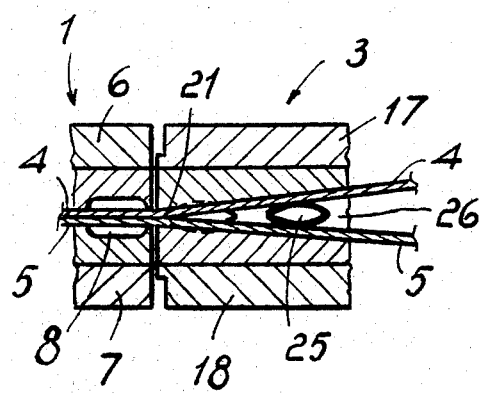
FIG. 9 is a detail of FIG. 7 to an enlarged scale.
Figure 11:
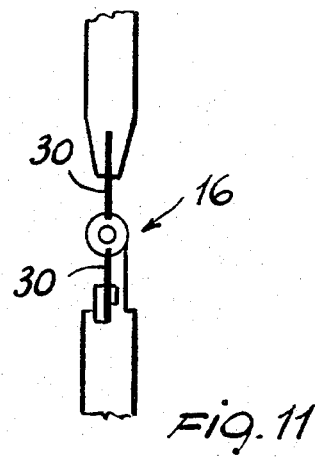

The degree of taper of this axial duct 26 is such that in proximity of the end 21, the cross-section of the duct 26 disappears, with the mating of the plates 17 and 18. The cavities or sheaths 25 are advantageously of an essentially elliptical cross-section. FIG. 9 shows on an enlarged scale the detail of the end 21 of the mould 3 and a small section of the thermowelding mould 1. The mould 2 has a structure practically analogous to the drawing mould 2 of FIGS. 1–4.

The number of sheaths for each of the alignments of the mould 2 is greater than the number provided in the alignments of the moulds 1 and 3 by one unit.

The nozzle 16 is supported by the machine by an appendix 27. When the ducts 13 and 26 have a square cross-section, the nozzle 16 has also a square configuration (FIG. 10), and in this case the nozzle is provided with a pair of lower blades 28 and a pair of upper blades 29, for separating the sets of containers gradually produced. When the duct 13 and duct 26 have a circular cross-section, the nozzle 16 also has a circular configuration (FIG. 11) and in this case the nozzle is provided with only one pair of blades 30 disposed upperly and lowerly in vertical alignment.

The operation of this embodiment of the apparatus is substantially analogous with the preceding.

Having thermowelded the superimposed films in the mould 1 to form non-welded zones, the thermowelded section is brought into a position corresponding with the mould 3, where the duct for feeding the drawing air is closed. As in the case of the mould 3 of the embodiment shown in FIGS. 1–4, a temperature is used here which is considerably less than the temperature used for the thermowelding in the mould 1, for example 100°C. In this embodiment however, in addition to the closure there is also a predrawing or preforming effect on the sheaths. Because of the particular shape and taper of the duct 26, the air so blown is prevented from escaping from the terminal zone 21 of the duct 26, and as it permeates through the non-welded zones it preforms these latter, so deforming the plastic films 4 and 5 and making them adhere to the internal lateral surface of both the duct 26 and cavities 25.

Because of the said chosen temperature, which is less than the thermowelding temperature but greater than the drawing or forming temperature for the plastic material, the deformation which the non-welded zones undergo in this predrawing or preforming stage is not permanent.

Moreover the closure of the duct 26 at the end 21 of the predrawing mould 3, or upstream of the drawing mould 2, at a temperature (of predrawing) considerably less than the thermowelding temperature, enables the central duct to be closed in an airtight manner without the films becoming welded together by their contact, so avoiding the presence of the said permanent contraction in the films which occurs in known methods and prevents further advancement of the films when the contraction comes into contact with the nozzle for blowing the air.

The arrangement used of positioning the moulds one after the other and touching along a line in the same direction as the direction of advancement of the plastic films avoids reswelling of the films in the touching zones.

Numerous other modifications of the invention are possible without leaving the scope of the inventive idea. Instead of blowing a pressure fluid into the central longitudinal duct it is of course also possible to form the sheath containers by suction, that is subjecting the outer surface of the non-welded zones within the forming mould to a reduced pressure.

I claim:

1. A method for continually producing sheath containers from thermoplastic material in form of continuous films, comprising the steps of intermittently feeding two superimposed films of thermoplastic material to a molding equipment including at least a thermowelding mold and a forming mold, thermowelding said films to define a plurality of non-welded zones extending substantially transversely to said films and a non-welded central zone extending longitudinally with respect to said films and communicating with each of said transverse zones, and forming said sheath containers by subjecting the outer surface of said non-welded zones within said forming mold to a reduced pressure while maintaining said central longitudinal zone at a point upstream of said forming mold at a temperature less than the thermowelding temperature of said films for temporarily closing said central longitudinal zone at said point during forming of sheath containers.

2. A method for continually producing sheath containers from thermoplastic material in form of continuous films, comprising the steps of intermittently feeding two superimposed films of thermoplastic material to a molding equipment including at least a thermowelding mold and a forming mold, thermowelding said films to define a plurality of non-welded zones extending substantially transversely to said films and a non-welded central zone extending longitudinally with respect to said films and communicating with each of said transverse non-welded zones, and forming said sheath containers within said forming mold by blowing a pressure fluid into said central longitudinal zone while maintaining said central longitudinal zone at a point upstream of said forming mold at a temperture less than the thermowelding temperature of said films for temporarily closing said central longitudinal zone at said point during forming of said sheath containers.

3. A method as claimed in claim 2, wherein during forming of said sheath containers said central longitudinal zone at said point upstream of said forming mold is maintained at a temperature less than the thermowelding temperature and higher than the forming temperature.

4. A method as claimed in claim 2, wherein said temporarily closing of said central longitudinal zone is carried out at a point upstream of said forming mold and said thermowelding mold.

5. A method as claimed in claim 2, further comprising the step of preforming said films to define preformed containers before forming thereof, wherein said films are made of polyvinyl chloride and said thermowelding step is carried out at a temperature of substantially 200°C, said preforming step at a temperature of substantially 100°C and said forming step at a temperature of substantially 50°C.

6. A method as claimed in claim 2, further comprising the step of preforming said films within a preforming mold while temporarily closing said central longitudinal zone at said point upstream of said forming mold to define preformed containers between said point and said forming mold.

7. A method as claimed in claim 6, wherein said temporarily closing of said central longitudinal zone at said point upstream of said forming mold and said preforming steps are carried out after thermowelding and before forming.

* * * * *